(12) United States Patent  (10) Patent No.: US 8,947,537 B2
Lewinnek et al.  (45) Date of Patent: Feb. 3, 2015

(54) ROTATABLE CAMERA MODULE TESTING SYSTEM

(71) Applicant: Teradyne, Inc., North Reading, MA (US)

(72) Inventors: David Walter Lewinnek, Somerville, MA (US); Richard Pye, Burlington, MA (US)

(73) Assignee: Teradyne, Inc., North Reading, MA (US)

( * ) Notice: Subject to any disclaimer, the term of this patent is extended or adjusted under 35 U.S.C. 154(b) by 37 days.

(21) Appl. No.: 13/775,919

(22) Filed: Feb. 25, 2013

(65) Prior Publication Data

US 2014/0240518 A1   Aug. 28, 2014

(51) Int. Cl.
*H04N 17/00* (2006.01)
*H04N 5/225* (2006.01)

(52) U.S. Cl.
CPC ............ *H04N 17/002* (2013.01); *H04N 5/2257* (2013.01)
USPC ............ 348/187; 348/180; 348/189; 348/175

(58) Field of Classification Search
CPC ............................. H04N 17/002; H04N 17/00
USPC ......... 348/187, 180, 181, 189, 175, 174, 190, 348/188; 235/438, 440
See application file for complete search history.

(56) References Cited

U.S. PATENT DOCUMENTS

| | | | |
|---|---|---|---|
| 7,499,600 B2 | 3/2009 | Ojanen et al. | |
| 2002/0122113 A1 | 9/2002 | Foote | |
| 2004/0189812 A1 | 9/2004 | Gustavsson et al. | |
| 2005/0231596 A1* | 10/2005 | Marchese | 348/187 |
| 2006/0001925 A1 | 1/2006 | Tatarczyk | |
| 2006/0077259 A1 | 4/2006 | Knoedgen et al. | |
| 2006/0103754 A1* | 5/2006 | Wenstrand et al. | 348/349 |
| 2010/0127078 A1 | 5/2010 | Brock et al. | |
| 2010/0271503 A1 | 10/2010 | Safaee-Rad et al. | |
| 2012/0169842 A1 | 7/2012 | Chuang et al. | |
| 2013/0317650 A1* | 11/2013 | Jenkinson et al. | 700/259 |
| 2014/0340680 A1* | 11/2014 | Montminy et al. | 356/326 |

FOREIGN PATENT DOCUMENTS

| | | |
|---|---|---|
| JP | 2009-100260 | 5/2009 |
| KR | 10-2005-0073069 | 7/2005 |
| KR | 10-2009-0012612 | 2/2009 |
| KR | 10-2009-0028011 | 3/2009 |
| KR | 10-2011-0051970 | 5/2011 |
| KR | 10-2012-0052595 | 5/2012 |

OTHER PUBLICATIONS

International Search Report and Written Opinion mailed May 22, 2014 in international application No. PCT/US2014/015814, 12 pgs.

(Continued)

*Primary Examiner* — Jefferey Harold
*Assistant Examiner* — Jean W Desir
(74) *Attorney, Agent, or Firm* — Fish & Richardson P.C.

(57) ABSTRACT

An example system for testing camera modules may include: a polygonal structure that is rotatable, where the polygonal structure includes faces, each of which is configured to receive at least one camera module under test; and targets facing at least some of the faces of the polygonal structure, where each target is usable in testing a corresponding camera module facing the each target.

28 Claims, 5 Drawing Sheets

(56) References Cited

OTHER PUBLICATIONS

Machine translation of KR-10-2012-0052595, 9 pgs.
Machine translation of KR-10-2009-0012612, 16 pgs.
Machine translation of KR-10-2005-0073069, 7 pgs.
Non-Final Office action mailed Apr. 23, 2014 in U.S. Appl. No. 13/776,076, 14 pgs.
http://www.the-digital-picture.com/Help/ISO-12233.aspx (downloaded Feb. 12, 2014).
International Search Report and Written Opinion mailed May 22, 2014 in international application No. PCT/US2014/015924, 14 pgs.
Machine translation of KR-10-2009-0028011, 12 pgs.
Machine translation of KR-10-2011-0051970, 16 pgs.
Machine translation of JP-2009-100260, 14 pgs.

* cited by examiner

ROTATABLE CAMERA MODULE TESTING SYSTEM

TECHNICAL FIELD

This patent application relates generally to a rotatable camera module testing system.

BACKGROUND

Camera modules are integrated into numerous devices, including mobile telephones, tablet computing devices, and laptop computers. A camera module typically includes one or more rectangular image sensors. In some types of testing, an image of a testing target is focused on the image sensor, and the resulting image is measured for compliance with applicable standards to determine whether the image module is functioning properly. For example, an ISO-12233 standard testing target may be used to measure image sharpness.

Known camera module testers position camera modules linearly, and test the camera modules in assembly-line fashion. An illuminator, either in front or in back of each camera module, illuminates a testing target in front of the camera module. The camera module is tested, in the manner described above, using images taken of the testing target, and then proceeds to a next station for a next test.

Figure 1:
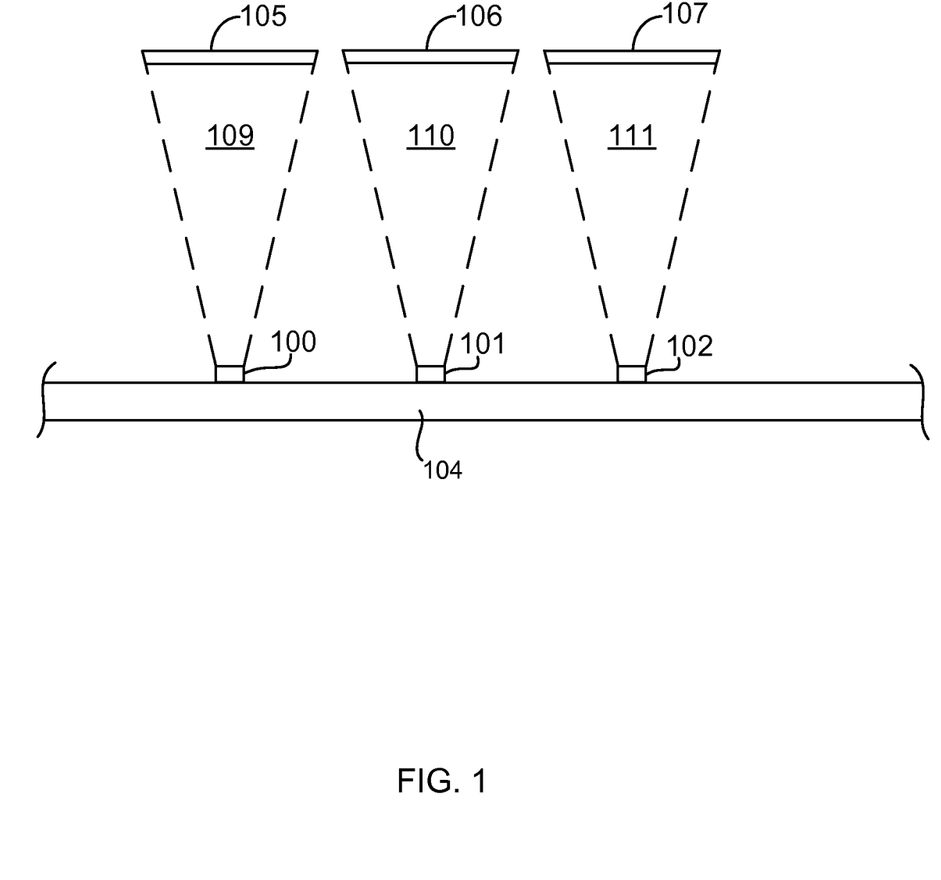
FIG. 1 is block diagram of a conventional camera module testing system.

Linear testing can be an inefficient use of space, since the camera module and targets require an exclusive truncated square pyramidal area between each module and target. This is due to the conical nature a lens' field of view and the rectangular image sensor within the camera module. For example, as shown in FIG. 1, camera modules 100, 101 and 102 are on testing line 104 and face targets 105, 106 and 107. Areas of non-interference 109, 110, and 111 (called "keep-out areas") are required between the camera modules and targets in order to ensure that testing is performed accurately. This requirement can define the minimum amount of space required for camera module testing.

SUMMARY

An example system for testing camera modules may include a polygonal structure that is rotatable and that includes faces. Each of the faces is configured to receive at least one camera module under test. The example system may also include targets facing at least some of the faces of the polygonal structure. Each target may be usable in testing a corresponding camera module facing the each target. The example system may also include one or more of the following features, either alone or in combination.

Each face may be configured to receive multiple camera modules. Multiple camera modules may be arranged one dimensionally on at least one face. Multiple camera modules may be arranged two dimensionally on at least one face.

The polygonal structure may be oriented, and rotatable, along an axis that is parallel to a ground plane. The polygonal structure may be oriented, and rotatable, along an axis that is perpendicular to a ground plane.

The targets may be stationary relative to the polygonal structure.

At least one of the faces of the polygonal structure may be reserved for loading and/or unloading the at least one camera module.

A non-interference area may be defined between fields of view of each camera module and a corresponding target. The system may include one or more light sources mounted between at least two non-interference areas. Lighting may be mounted within, or external to, a volume enclosed by the targets.

Control electronics may control rotation of the wheel and to communicate with the at least one camera module under test. The control electronics may be located within a volume enclosed by the targets. The control electronics may be located external to a volume enclosed by the targets.

An example system for testing camera modules may include: a wheel configured for mounting camera modules under test, where each camera module comprises an image sensor. The example system may include targets surrounding, and facing, an exterior circumferential surface of the wheel such that a plane of each target is perpendicular to an optical axis of a lens in a lens assembly of a corresponding camera module. Relative motion between the wheel and the targets enables image sensors of different camera modules to face different targets. The example system may also include one or more of the following features, either alone or in combination.

The wheel may have a polygonal cross-sectional shape comprised of multiple sides. Camera modules may be mounted on at least some of the sides. The wheel may have a circular cross-sectional shape and may comprise structure for holding the camera modules. The wheel may be rotatable and the targets may be stationary such that rotation of the wheel results in the relative motion between the wheel and the target. Camera modules may be mounted on the wheel such that, in at least one instance, multiple camera modules face a single target.

The wheel may be oriented, and rotatable, vertically relative to a ground plane. The wheel may be oriented, and rotatable, horizontally relative to a ground plane. The wheel may comprise areas for mounting camera modules under test. At least one of the areas for mounting camera modules under test may be reserved for loading and/or unloading at least one camera module.

A non-interference area may be defined relative to each camera module and corresponding target. The system may include one or more light sources mounted between at least two non-interference areas. At least some of the targets may be located at different distances from the wheel.

The wheel may be a first wheel and the system may include the following: a second wheel configured for mounting second camera modules under test, where each second camera module includes a second image sensor having a planar surface; and second targets arranged around, and facing, the second wheel such that a plane of each second target is perpendicular to an optical axis of a lens in a lens assembly of a corresponding second camera module; and a robot to move camera modules between the first wheel and the second wheel. Relative motion between the second wheel and the second targets enables second image sensors of different camera modules to face different targets.

An example method of exposing camera modules to targets may include the following: arranging the camera modules on an exterior circumference of a structure such that image sensors of at least some of the camera modules face outwardly towards corresponding targets; and rotating the structure so that different image sensors face different targets at different times. The example method may also include one or more of the following features, either alone or in combination.

Rotating the structure may expose each image sensor to successive targets.

The camera modules may be arranged such that multiple image sensors face a same target in at least one orientation of the structure. The arranging may include loading a camera module onto the structure using a robotic mechanism. The camera module may be loaded onto an area of the structure designated for receiving camera modules. The method may include unloading a camera module from the structure following completion of testing. The camera module may be unloaded using a robotic mechanism.

An example system for testing camera modules may include: a structure that is rotatable and that is configured to hold camera modules under test, where each of the camera modules has an image sensor with a planar surface; targets mounted relative to the structure, where each target is usable in testing a corresponding camera module; and optics to direct light between the camera modules and the targets so that a plane of each target appears to be perpendicular to an optical axis of a lens in a lens assembly of a corresponding camera module. The optics may include one or more mirrors and/or one or more prisms.

Any two or more of the features described herein, including in this summary section, may be combined to form embodiments not specifically described herein.

Parts of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompanying drawings and the description below. Further features, aspects, and advantages will become apparent from the description, the drawings, and the claims.

DETAILED DESCRIPTION

Described herein is a test system for testing optical devices, such as camera modules. Generally, a camera module includes one or more image sensors and an interface for communicating with external electronics. Generally, an image sensor is a device for converting an optical image into an image signal. A camera module may also include a lens assembly. A lens assembly includes at least one lens, and may also, but need not, include filters, focusing motors, and other optics. The lens assembly may have a non-variable (or "fixed") focus or it may have a variable focus.

The test systems described herein are usable to test any appropriate type of camera modules including, but not limited to, camera modules that may be incorporated into digital cameras, mobile telephones, tablet computing devices, and laptop computers. The test systems, however, are not limited to use with testing camera modules, and may be used to test other types of optical devices.

Figure 2:
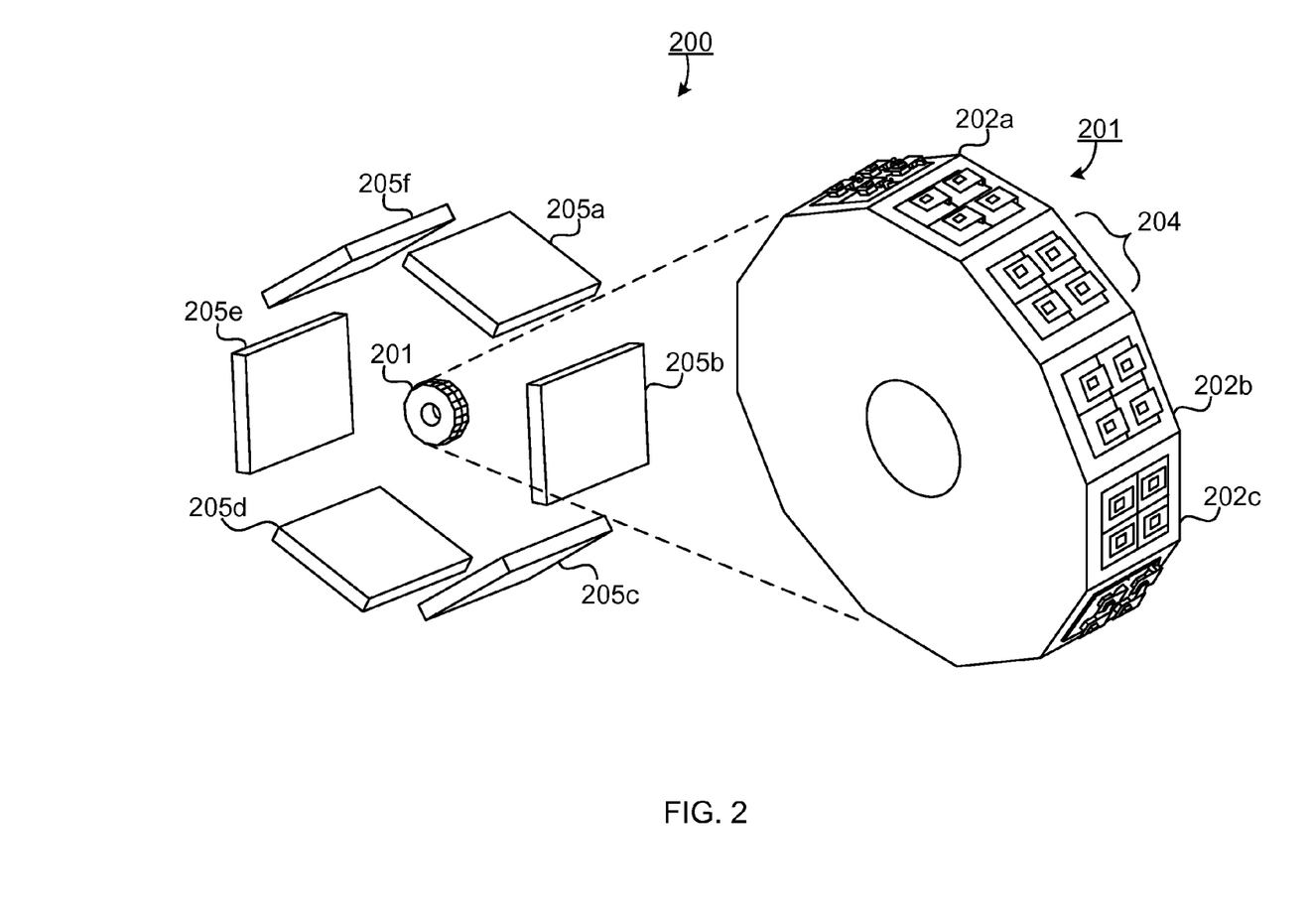
FIG. 2 is a perspective view of a portion of a camera module testing system.

FIG. 2 shows an example implementation of a portion of an example test system 200. FIG. 2 includes a polygonal structure, or "wheel" 201, having multiple circumferential faces 202a, 202b, 202c, etc. on which camera modules may be mounted for testing.

In the implementation of FIG. 2, wheel 201 is a wheel with twelve equal chamfers (faces) along its exterior circumferential surface, which are configured to hold camera modules, although the test system is not limited to use with a wheel having twelve faces. In the example implementation shown in FIG. 2, wheel 201 is configured to hold four camera modules 204 per face, although any number of camera modules can be held on a face. In this example, each camera module includes a rectangular image sensor having a planar surface; however, other types of camera modules may be tested that do not have planar imaging surfaces.

Surrounding the wheel are testing targets 205a to 205f. Six testing targets are shown; however, any appropriate number may be used. The testing targets may be mounted on any appropriate structure such that the plane of each testing target is perpendicular to the optical axis of a lens in the lens assembly of a corresponding camera module. For some image sensors that have planar surfaces, this may be achieved by mounting the testing targets so that the plane of each camera image sensor is parallel to, or substantially parallel to, the plane of each corresponding target. An example of a testing target that may be used is the ISO-12233 standard testing target; however, different types of testing targets may be used for different camera modules. Other examples of testing targets that may be used are described in U.S. patent application Ser. No. 13/776,076, filed concurrently herewith and entitled "Matrix Testing Targets".

The wheel turns at a rate controlled by electronics that is either local to, or remote from, the wheel, as described below. In this context, electronics is deemed local to the wheel if the electronics is within a volume defined by the test targets, and remote from the wheel if the electronics is external to a volume defined by the test targets. The manner in which the wheel turns is typically not continuous, but rather the wheel indexes, or "clicks", so that camera modules mounted on each face of the wheel spend time at each test station. In this context, a test station is a point in space, through which the wheel turns, at which a test may be performed. As described below, different tests may be performed at different test stations, some involving targets like those shown in the figures, and others not. In some implementations, the wheel may index every 10 seconds; however, the systems described herein are not limited to 10 second indexing. In some implementations, the same amount of time may be spent at each test station. In other implementations, different amounts of time may be spent at different test stations.

Figure 3:
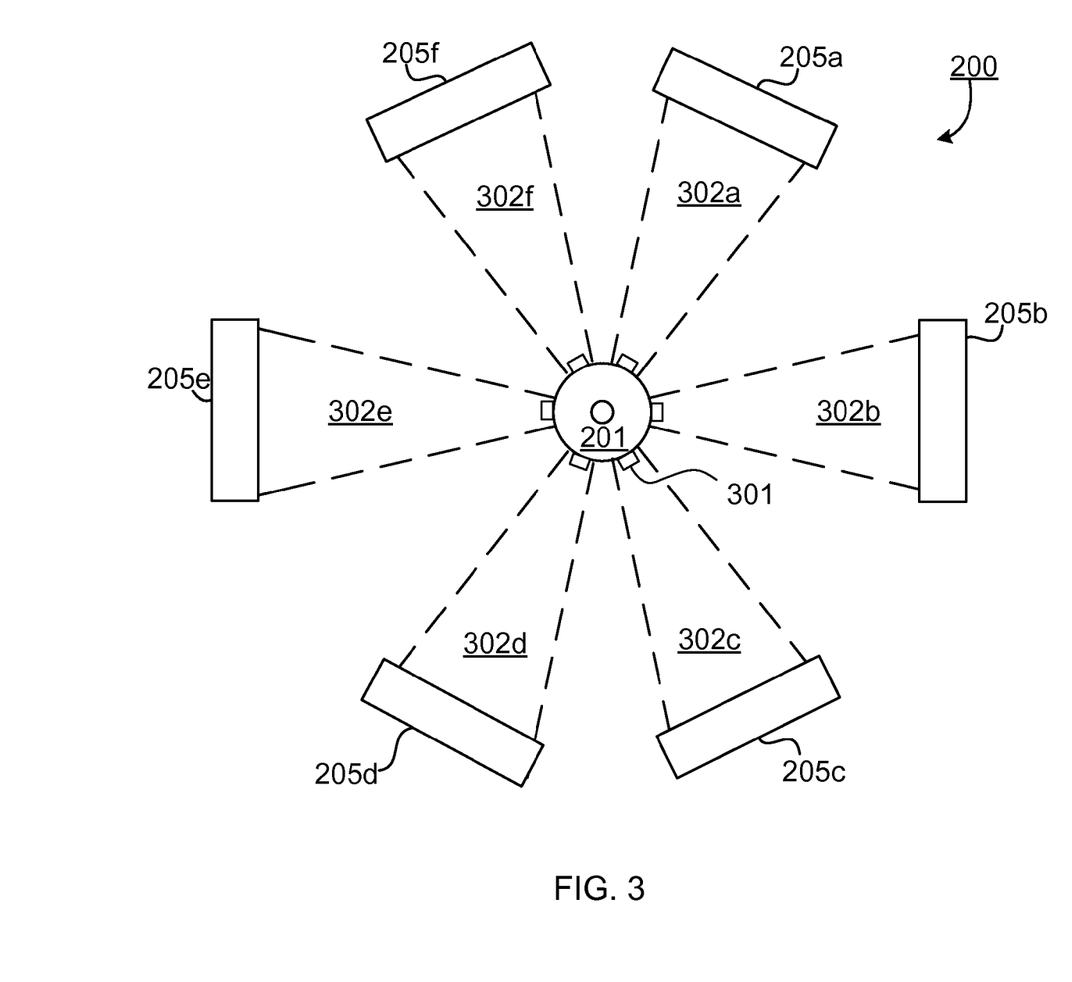
FIG. 3 is a side view of the portion of the camera module testing system of FIG. 2.

FIG. 3 shows a side-view of the example implementation of test system 200. As shown in FIG. 3, image sensors 301 face a corresponding testing target 205c so as to obtain an image of the target. The resulting image is processed by one or more computing devices (not shown in FIGS. 2 and 3) to determine whether feature(s) of the camera module are operating correctly.

The viewing (non-interference) area 302a to 302f of each corresponding rectangular image sensor is a truncated square pyramid in shape, cross-sections of which are shown in FIG. 3. For example, in some camera modules, the field of view is 70° and fans out, as shown. Targets within these areas are illuminated using various types of light, such as simulated sunlight, tungsten light, and others. In some implementations, there should be no overlap of the non-interference areas and structures (except lenses and other optics) should not impinge on the non-interference areas. This is to ensure that tests performed on a camera module at one test station do not impact tests performed on other camera module(s) when they are positioned at other test station(s).

Figure 4:
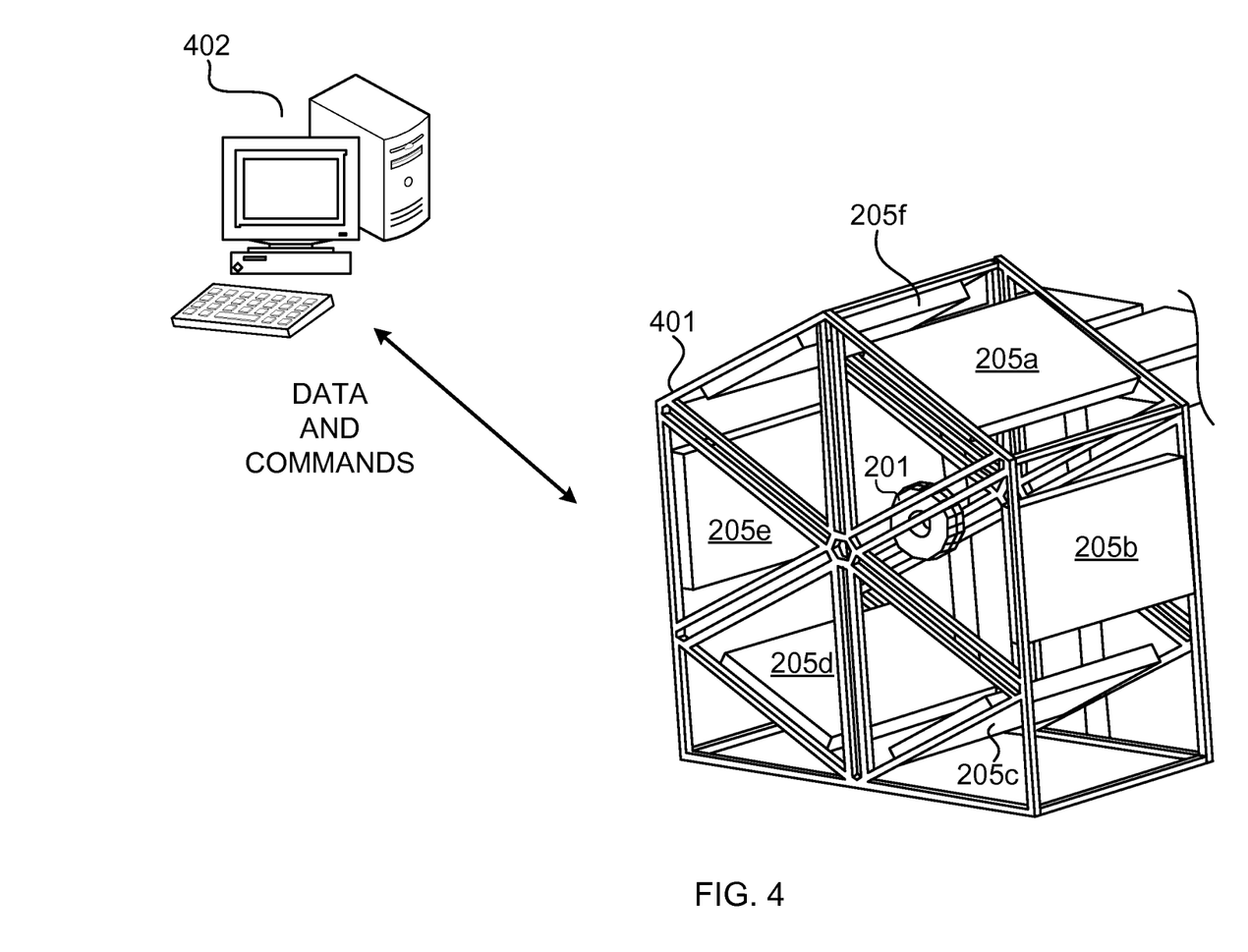
FIG. 4 is a perspective view of the camera module testing system, including a frame and a test computer.

In some implementations, there may be structure between the non-interference areas, onto which lighting or other elements may be mounted. For example, FIG. 4 shows a frame 401, on which testing targets 205a to 205f are mounted. Also shown in FIG. 4 is wheel 201 containing camera modules under test. Wheel 201 may be mounted to a computer-controlled axle (not shown) to control motion of the wheel relative to the testing targets. In some implementations, the testing targets are stationary and the wheel is movable (e.g., rotatable). In other implementations, the testing targets may also be movable, e.g., to change them or during testing. In this example implementation, the axis of rotation is parallel to the ground plane, resulting in vertical rotation of the wheel during testing.

In some implementations, LEDs or other lighting (not shown) may be mounted on frame 401 between one or more of the non-interference areas to illuminate corresponding targets. In some implementations, the targets may be back-lit, and the lighting therefor mounted elsewhere on, or external to, frame 401. In some implementations, light blocking devices, such as shades, may be mounted between the non-interference areas so as to reduce or to prevent light from one test affecting the results of another test.

In some implementations, electronics may be mounted on the frame, between the non-interference areas or elsewhere. The electronics may include, but is not limited to, one or more microprocessors, one or more microcontrollers, memory, wireless communication circuitry, and so forth. This electronics may be used, among other things, to control movement of wheel 201 relative to the testing targets, to collect information (e.g., test data) from the camera modules, to communicate that information to a remote or local computer system (e.g., a test station), and to send commands to the camera modules during testing. For example, the testing may require adjustment of one or more features of the camera modules, and that adjustment may be controlled locally (e.g., by circuitry mounted to the frame or wheel) or remotely (e.g., via a test station that communicates with such circuitry).

In some implementations, there may be only one camera module per face of the wheel during test. In other implementations, there may be multiple camera modules per face, as shown in FIG. 2. In this regard, in FIG. 2, there are four camera modules per face. In other implementations, there may be more or less than four camera modules per face. For example, there may be 2, 3, 4, 5, 6, 7, 8, 9, 10, 11, 12, 13, 14, 15, 16, and so forth (counting by one) camera modules mounted on a single face, depending upon the sizes of the camera modules and the sizes of the faces. The camera modules may be mounted one dimensionally (e.g., in a line) or two dimensionally (e.g., in an N×M matrix, where N and M are each integers greater than or equal to two). Mounting more than one camera module on each face enables parallel testing of the camera modules.

Figure 5:
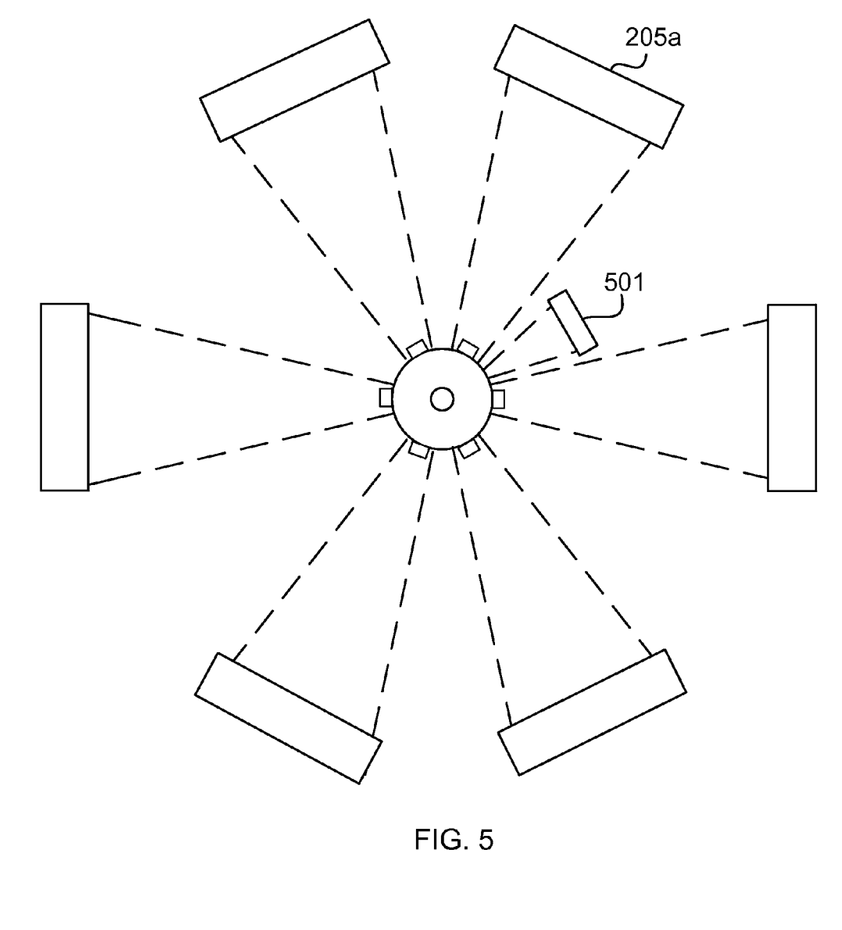
FIG. 5 is a side view of the portion of the camera module testing system of FIG. 2, which includes targets at different distances.

In the implementations shown in FIGS. 2 to 4, testing targets are all the same distance from wheel 201. This need not be the case. For example, as shown in FIG. 5, testing targets 205a and 501 may be placed at different distances from the wheel in order to perform different tests. In some implementations, optics, including but not limited to one more lenses and prisms, may be placed in between camera modules on the wheel and test targets (in or between non-interference areas). The optics may be used to simulate distance between corresponding camera module(s) and testing target(s). For example, a lens may be placed between a camera module and a target in order to simulate a greater distance between the camera module and target than actually exists. For example, the lens and/or other optics may be placed in an non-interference area between and the target. In some implementations, the lens and/or other optics may be placed in between interference areas, or portions thereof may be in an interference area and other portions thereof may be between interference areas.

In some implementations, there may be a testing target corresponding to each face of the wheel. In other implementations, there need not be a testing target corresponding to each face of the wheel. For example, tests or other processes, which do not involve testing targets, may be performed on camera modules mounted on the wheel. For example, a camera lens may be glued at one test station along the wheel and positioned to achieve appropriate imaging (referred to as "active alignment"). In another test station of the wheel (e.g., the next consecutive test station), that glue may be cured so as to fix the lens in the correct position. In other implementations, a "dark test" may be performed at a test station of the wheel. In such a test, a target is not needed, and pixels of the image sensor are tested in the dark in order to determine if any of those pixels are self-illuminating. In other implementations, at different test stations, D50, D65, and other illuminators may be used to measure reaction of the camera module to light simulating a sunny day, a cloudy day, and so forth. In other implementations, at different test stations, tests may be performed to calibrate red, green and blue light. Any appropriate type of testing may be performed at different test stations.

As noted, in some implementations, test stations may include targets. The targets may be, e.g., used to perform spatial frequency resolution (SFR) tests, which measure image sharpness using fine lines. There may be SFR1, SFR2, SFR3 tests performed, which include sharpness measured at three different distances, which may be, e.g., any two of the following distances in some examples: 10 centimeters (cm), 30 cm, 60 cm, and 2 meters (m). The example test systems are not limited to these SFR tests; any appropriate testing may be performed using the example test systems.

In some implementations, one or more of the faces of a wheel may be unfilled during testing (i.e., there is no camera module mounted thereto) or may not be used for testing. For example, some faces may be unfilled to coordinate tests with other wheels or simply to extend the overall test time.

In some implementations, a single test station may be designated for both loading and unloading camera modules from the wheel. Accordingly, no testing is performed at that station. In operation, tested camera modules may be unloaded while, following unloading, untested camera modules may be loaded taking the place of those tested. In other implementations, there may be separate loading and unloading stations. For example, one station may be designated for loading camera modules to be tested onto the wheel and another station may be designated for unloading camera modules from the wheel following test.

In some implementations, all camera modules on the wheel are subjected to the same test(s) at each test station. In other implementations, the wheel and camera modules may be computer controlled so that not every camera module on the wheel is subjected to the testing performed at each station.

In some implementations, a computer-controlled robot (not shown) is used to load and/or unload camera modules from the wheel. The same robot may be used for both loading and unloading or different robots may be used to perform these tasks. In other implementations, the camera modules may be loaded and/or unloaded to/from the wheel manually. In some implementations, a test computer may control operation of the robot in response to test engineer commands. In other implementations, on-board system electronics may control robot operation.

The example wheel described above and shown in FIGS. 2 to 5 has twelve faces along its exterior circumferential surface. In other implementations, the wheel may have more faces or less faces. For example, in some implementations, the wheel may have 2, 3, 4, 5, 6, 7, 8, 9, 10, 11, 12, 13, 14, 15, 16, and so forth (counting by one) faces. Camera modules size and testing geometry may affect the number of faces that may be included on the wheel. In some implementations, the wheel may be circular in cross-section (and, therefore, cylindrical in structure), and include structures (e.g., pins, adhesives, or the like) on its exterior circumferential surface onto which camera modules may be mounted. As with a faceted wheel, each camera image sensor should be mounted such that the plane of each testing target is perpendicular to the optical axis of a lens in the lens assembly of a corresponding camera module. As noted above, for some image sensors that have planar surfaces, this may be achieved by mounting the testing targets so that the plane of each camera image sensor is parallel to, or substantially parallel to, the plane of each corresponding target.

As explained above, wheel 201 rotates vertically, meaning that its axis of rotation is parallel to, or substantially parallel to, a ground plane. This can be advantageous in that such rotation enables tests to account for effects of gravity. For example, the motion of the focusing motor of a camera module can be either positively or negatively assisted by gravity. For example, in some camera modules, for a far-away target, the motor extends the camera lens, and for a near target, the motor retracts the lens. So, tests may be performed on camera modules that test the focusing motor at different orientations. For example, a test using a far-away target may be performed while the camera module is facing upward, and a test using a near target may be performed while the camera module is facing downward. Other orientation-affected tests may also be performed.

In other implementations, camera modules may be mounted on a wheel that rotates horizontally, meaning that its axis of rotation is perpendicular to, or substantially perpendicular to, a ground plane. For example, the system of FIGS. 2 to 5 may be rotated by 90°, with other appropriate structural modifications, so that its axis of rotation is perpendicular to the ground plane. Testing on the various camera modules may then be performed in the manner described above.

In some test systems, multiple systems of the types shown in FIGS. 2 to 5 and described above may be used. In some test systems, a camera module may be subjected to a set of tests performed using one wheel-based system, and then the camera module may be loaded into a next consecutive wheel in the test system to subject the camera module to the set of tests in that wheel-based system, and so forth. The wheels may all be of the same type, or they may be different types, including with different numbers of faces, different axes or rotation, and so forth. Robots may control movement of the camera modules between wheels according to programming provided in appropriate test electronics.

As indicated above, electronics are incorporated into the test systems described herein. The electronics can be mounted at any appropriate location on the test system. Leads to/from the camera modules may come from above each camera module to each module, leads may come through the side of the wheel along its axis, or the leads (or other electronics) may be implemented as a moving interface using slip rings. In some implementations, test electronics may move with wheel. For example, an FPGA or an ASIC may be pre-programmed with test routines, and may be used to control movement of the wheel, to control the camera modules under test, and/or to communicate with a remote test computer (e.g., computer 402 of FIG. 4). In other implementations, a remote test computer may provide commands for implementing test routines, and those commands may be routed to the wheel, the camera modules, or other electronics to perform appropriate testing. Commands and test data may be sent between test system 200 and computer 402 wirelessly, via a wired connection such as Ethernet, or a combination thereof.

In some implementations, a system for testing camera modules may include a structure (e.g., a wheel) that is rotatable and that is configured to hold camera modules under test. Testing targets of the type described herein are mounted relative to the structure, and optics are used to direct light between the camera modules and the targets so that the plane of each testing target appears perpendicular to the optical axis of a lens in the lens assembly of a corresponding camera module (e.g., so that planar surface of camera module image sensors appear parallel to, and facing, corresponding targets). Accordingly, the optical axes and corresponding targets need not be aligned in any particular manner so long as the optics can compensate for any misalignment. The optics may include one or more mirrors or prisms. Optics such as these may be incorporated into the example implementations of FIGS. 2 to 5. Example systems of this type may include camera modules mounted on a wheel, along with appropriate optics. In other implementations, the optics may be mounted off-wheel, and may be stationary relative to the wheel so as to direct light at each test station.

In other implementations, the wheel may be replaced with a three-dimensional polyhedron structure having faces on its exterior for holding camera modules under test. Examples of such structures may include, but are not limited to, a tetrahedron, a cube, an octahedron, a dodecahedron, and icosahedron, and so forth. Testing targets may be arranged around such a structure so there is correspondence between the faces and the testing targets. Camera modules may be mounted to the faces in the manner described elsewhere herein. The structure may be rotated in various dimensions so as to expose camera modules to different testing targets in any appropriate sequence. For example, the axis of rotation may be parallel to ground, perpendicular to ground, or at any appropriate angle relative to ground, depending on the structure. The axis of rotation may change depending on the test sequence, and may be controlled by appropriate electronics. All other appropriate features described herein are applicable to such implementations.

An advantageous feature of the example test system described herein may be that the system occupies less space than linear camera module test systems. In some implementations, such as the case where the wheel is rotatable vertically relative to the ground plane, gravitational testing may be performed without requiring that camera module be flipped during the testing process.

Control features described herein (e.g., control of wheel rotation, robot control, and so forth) can be implemented, at least in part, via a computer program product, e.g., a computer program tangibly embodied in one or more information carriers, e.g., in one or more tangible, non-transitory machine-readable storage media, for execution by, or to control the operation of, data processing apparatus, e.g., one or more programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the control features can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Any one or more features described in this disclosure may be combined with any one or more feature described in U.S. patent application Ser. No. 13/776,076, filed concurrently herewith and entitled "Matrix Testing Targets", the contents of which are incorporated herein by reference as if set forth in full. For example, the testing targets described in the "Matrix Testing Targets" application may be used as the testing targets in the example test systems described herein.

Elements of different implementations described herein may be combined to form other implementations not specifically set forth above. Other implementations not specifically described herein are also within the scope of the following claims.

What is claimed is:

1. A system for testing camera modules, comprising:
   a polygonal structure that is rotatable, the polygonal structure comprising faces, each face being configured to receive at least one camera module under test; and
   targets facing at least some of the faces of the polygonal structure, each target being usable in testing a corresponding camera module facing the each target.

2. The system of claim 1, wherein each face is configured to receive multiple camera modules.

3. The system of claim 2, wherein the multiple camera modules are arranged one dimensionally on at least one face.

4. The system of claim 2, wherein the multiple camera modules are arranged two dimensionally on at least one face.

5. The system of claim 1, wherein the polygonal structure is oriented, and rotatable, along an axis that is parallel to a ground plane.

6. The system of claim 1, wherein the polygonal structure is oriented, and rotatable, along an axis that is perpendicular to a ground plane.

7. The system of claim 1, wherein the targets are stationary relative to the polygonal structure.

8. The system of claim 1, wherein at least one of the faces of the polygonal structure is reserved for loading and/or unloading the at least one camera module.

9. The system of claim 1, wherein a non-interference area is defined between fields of view of each camera module and a corresponding target; and
   wherein the system further comprises one or more light sources mounted between at least two non-interference areas.

10. The system of claim 1, further comprising:
    lighting mounted within a volume enclosed by the targets.

11. The system of claim 1, further comprising:
    lighting mounted external to a volume enclosed by the targets.

12. The system of claim 1, further comprising:
    control electronics to control rotation of the wheel and to communicate with the at least one camera module under test.

13. The system of claim 12, wherein the control electronics are located within a volume enclosed by the targets.

14. The system of claim 12, wherein the control electronics are located external to a volume enclosed by the targets.

15. A system for testing camera modules, comprising:
    a wheel configured for mounting camera modules under test, each camera module comprising an image sensor; and
    targets surrounding, and facing, an exterior circumferential surface of the wheel such that a plane of each target is perpendicular to an optical axis of a lens in a lens assembly of a corresponding camera module;
    wherein relative motion between the wheel and the targets enables image sensors of different camera modules to face different targets.

16. The system of claim 15, wherein the wheel has a polygonal cross-sectional shape comprised of multiple sides; and
    wherein camera modules are mounted on at least some of the sides.

17. The system of claim 15, wherein the wheel has a circular cross-sectional shape and comprises structure for holding the camera modules.

18. The system of claim 15, wherein the wheel is rotatable and the targets are stationary such that rotation of the wheel results in the relative motion between the wheel and the target.

19. The system of claim 15, wherein camera modules are mounted on the wheel such that, in at least one instance, multiple camera modules face a single target.

20. The system of claim 15, wherein the wheel is oriented, and rotatable, vertically relative to a ground plane.

21. The system of claim 15, wherein the wheel is oriented, and rotatable, horizontally relative to a ground plane.

22. The system of claim 15, wherein the wheel comprises areas for mounting camera modules under test, at least one of the areas being reserved for loading and/or unloading at least one camera module.

23. The system of claim 15, wherein a non-interference area is defined relative to each camera module and corresponding target; and wherein the system further comprises one or more light sources mounted between at least two non-interference areas.

24. The system of claim 15, wherein at least some of the targets are located at different distances from the wheel.

25. The system of claim 15, wherein the wheel is a first wheel and wherein the system further comprises:

a second wheel configured for mounting second camera modules under test, each second camera module comprising a second image sensor having a planar surface; and second targets arranged around, and facing, the second wheel such that a plane of each second target is perpendicular to an optical axis of a lens in a lens assembly of a corresponding second camera module; and a robot to move camera modules between the first wheel and the second wheel;

wherein relative motion between the second wheel and the second targets enables second image sensors of different camera modules to face different targets.

26. A system for testing camera modules, comprising:

a structure that is rotatable and that is configured to hold camera modules under test, each of the camera modules having an image sensor with a planar surface;

targets mounted relative to the structure, each target being usable in testing a corresponding camera module; and optics to direct light between the camera modules and the targets so that a plane of each target appears to be perpendicular to an optical axis of a lens in a lens assembly of a corresponding camera module.

27. The system of claim 26, wherein the optics comprise one or more mirrors.

28. The system of claim 26, wherein the optics comprise one or more prisms.

* * * * *